H. S. CASSEL.
COMBINED HARVESTING AND THRESHING MACHINE.
APPLICATION FILED JUNE 24, 1918.
1,321,979.
Patented Nov. 18, 1919.
2 SHEETS—SHEET 2.
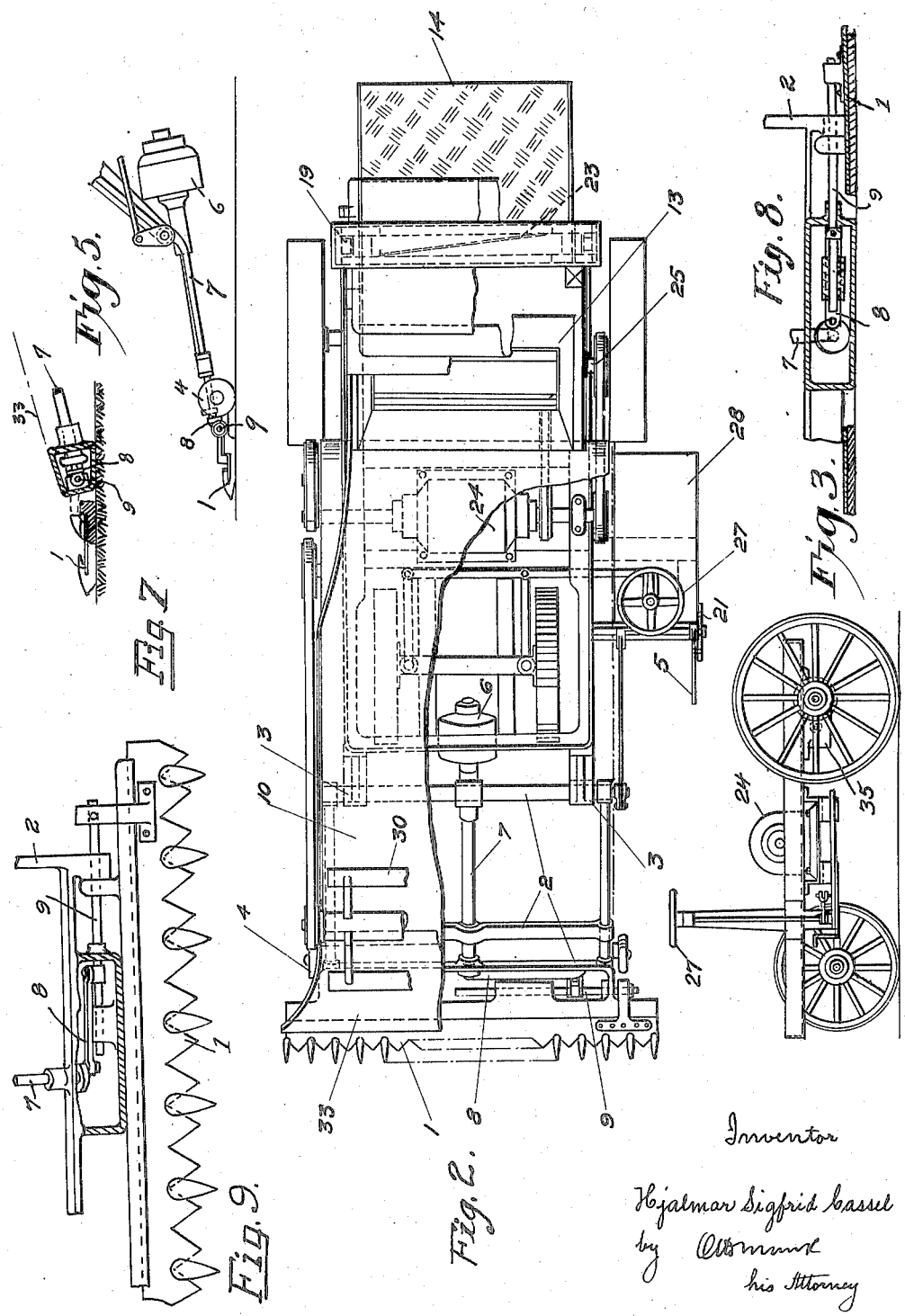

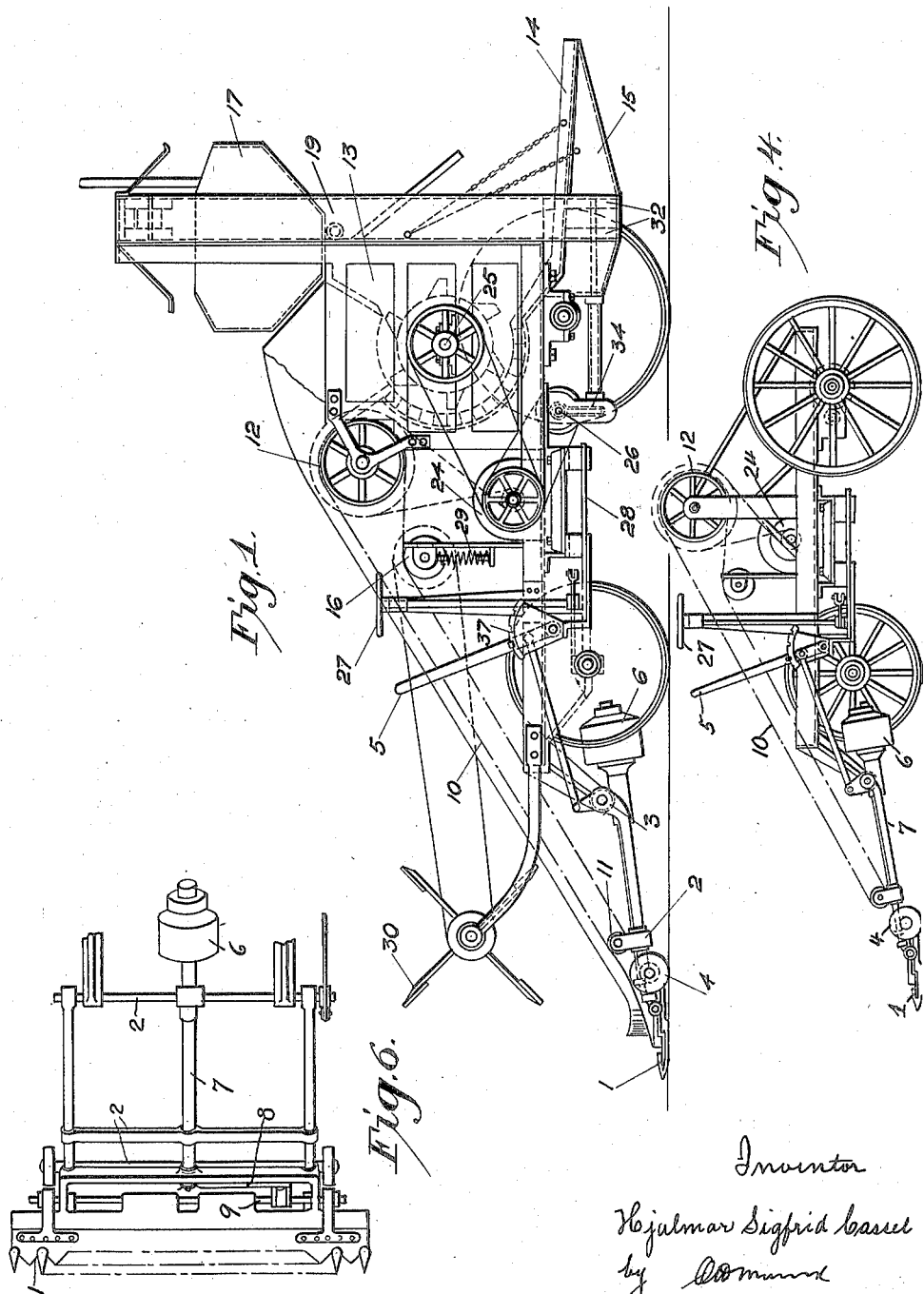

UNITED STATES PATENT OFFICE.

HJALMAR SIGFRID CASSEL, OF STOCKHOLM, SWEDEN.

COMBINED HARVESTING AND THRESHING MACHINE.

1,321,979. Specification of Letters Patent. Patented Nov. 18, 1919.

Application filed June 24, 1918. Serial No. 241,664.

*To all whom it may concern:*

Be it known that I, HJALMAR SIGFRID CASSEL, a subject of the King of Sweden, and a resident of Stockholm, Sweden, have invented certain new and useful Improvements in Combined Harvesting and Threshing Machines, of which the following is a specification.

The present invention relates to harvesting machines having separate motors for propelling the carriage, and separate motors for the harvesting and threshing machinery, the different members of which, such as a knife for cutting the corn, an endless track for transporting the corn from the knife to the threshing machinery, and the threshing machinery with appurtenant parts, may be driven and regulated independently of the movement of the carriage, and be easily removed separately from the carriage. This arrangement is specially adapted for electrically driven combined harvesting and threshing machines, with two motors for propelling the carriage. A particular advantage of this system is that the cutting knife can be driven by an electric motor specially intended for this purpose. This renders it possible to regulate the running of the knife independently of the rest of the machinery, and to couple the knife direct to the motor, without the ordinary power-consuming transmission devices, and in such a manner that the coupling of the knife to the motor is placed in a dust-free, closed slide chamber, entirely filled with oil, whereby wear and tear and friction are reduced to a minimum. This arrangement also permits of the carriage being used with knives only as a mowing machine.

Hereinbelow is described a form of such an automatic machine, driven electrically by means of an overhead wire or a wire placed in an insulated dragging cable.

Figure 1 is a side elevation view of the machine, the near rear wheel being omitted; Fig. 2 is a top plan view, removable cover plate which is adapted to rest on the upper part of the machine, being partly broken away; Fig. 3 is a side elevational view of the carriage, with the harvesting and threshing apparatus removed therefrom; Fig. 4 is a side elevational view of the machine in the condition of use for traction purposes only; Fig. 5 is a side elevational view of the cutter and the motor for actuating the same; Fig. 6 is a top plan view of the removable cutter frame, showing the cutter and the motor for actuating the same; Fig. 7 is a detail view, partly in section, of the clutch coupling between the knife mechanism and the motor shaft; Fig. 8 is front elevational view, partly in section, of the parts shown in Fig. 7; and Fig. 9 is a top plan view, partly in section, of the parts shown in Figs. 7 and 8.

The corn is cut with a knife 1, lying in front of the machine, similar to those employed in ordinary harvesters. With the aid of a reel 30, with rotating wings, the cut-off corn is thrown on to an endless apron 10, which extends between two rollers 11, 12 and is carried down into the threshing mill 13, of known construction, which in the ordinary manner separates the grain, which falls down through a grating 14, into an underlying receptacle 15, while the chaff and the straw are thrown out on the field, as the machine moves forward. By feeding out the straw with intermittently rotating wings, the straw can also be gathered into sheaves, similarly to what takes place in the ordinary reaping attachment. Also, as often occurs in ordinary threshing the straw can be pressed into a straw press, which is then combined with the machine. As these constructions are known, they have not been shown.

The knife 1 is fitted on a removable frame 2, suspended in two bearings 3, fixed to the carriage frame in such a manner that the heavier front part of the removable frame rests on the ground with two small wheels (4), placed close to the knife whereby the knife will closely follow the unevenesses of the ground. The rear part of the frame 2 with the motor 6 is however, slightly lighter, so that only a small amount of force is required to lift the knife, which may be effected by means of a lever 5 which acts on the shaft of the frame by means of an ordinary link system and, when necessary, can by means of a pawl 37, hold the knife permanently lifted at different heights.

The knife is driven by an electric motor 6, especially arranged for the purpose, and which is attached to the rear part of the frame 2; a shaft 7, connected with the shaft of the motor drives, by means of the connecting-rod 8, a slide 9 combined with the knife. As shown in Figs. 1 and 2 I may provide a removable cover 33 to lie over the machine and protect the operative parts thereof from dust and dirt. In order to hold the apron taut, there is placed under it a roller 16, which by means of a spring 29 presses against the apron. When the corn has been threshed and the grain has dropped down into the receptacle 15, it is fed thence by means of an endless steel band 19, provided with laminæ, or any other elevator of known construction, up to an upper pivoted receptacle 17, which, when necessary is emptied by means of a hand lever, the grain then running down into a transport truck of the ordinary type. An electric motor 24 drives by means of suitable belts the threshing mill on the shaft 25, the apron 10 and a shaft 26, which by means of a screw gearing 34 drives the shaft of the wheels 32 by which the grain elevator is operated. The reel 30 is driven with a chain gearing by the tension roller 16. The carriage has four wheels, of which the two rear ones are separately free and are driven each by its motor 35 in a way used in electric motor-cars, either closed in the wheel or driven by a gearing. The two front wheels are, as is usual in four-wheeled motor-cars rotatable each around its axle, and are steered by an ordinary link system with the aid of a steering wheel 27, which is operated by the driver, standing on the platform 28. As each motor separately can be electrically operated (by well-known devices), the carriage may be easily steered. The two driving motors 6 and 24 can obviously be driven at different speeds, etc., in the well-known manner.

When the combined harvesting and threshing machine is no longer desired to be used as such, all the parts belonging to the harvesting and threshing machinery can be removed, whereupon the carriage can be used as a transport truck, or, retaining the main motor, as a working agricultural machine for various purposes, other working members required for the purpose having been fitted on the frame of the carriage. In dismounting the machine, the tension roller 16 is first removed by detaching the bearing iron from the frame of the carriage; then the roller 11 is detached, and the apron is laid on the threshing mill 13; further, the frame 2 is removed by unscrewing the bearing 3; the reel 30, with its bearing arms, is unscrewed from the carriage frame; the screw gearing 34 with wheels and shafts is inclosed in a cast-iron journal-box which is unscrewed from the frame; finally the entire threshing mill 13 with carrier, and all is lifted out of the carriage backward and placed on a stand. Fig. 3 shows the carriage dismounted, with the main motor 24. It is also possible to retain only the frame 2 with the knife 1, and to use the machine for mowing purpose. In Fig. 4 the apron 10 is also retained, by means of which the mown grass is carried over the carriage and made to fall down at the back of it, in order to avoid the accumulation of the grass in front of the machine.

Claims:

1. In a machine of the character specified, the combination with an electric motor car or tractor, of a removable knife-supporting frame carried by the carframe, a mower knife in said removable frame, a separate motor carried by said removable frame for actuating said mower knife, a removable threshing mill carried by said car, a separate motor for driving said mill, and means for conveying the material cut by said knife to said threshing mill.

2. In a machine of the character specified, the combination with an electric car or tractor, of two driving wheels independent of each other, a separate motor for driving each of said wheels, a removable knife-supporting frame, a mower knife carried by the frame, a separate motor carried by said removable frame for actuating said mower knife, a removable threshing mill carried by said car, a separate motor for driving said mill, and means for conveying the material cut by said knife to said threshing mill.

3. In a machine of the character specified, the combination with an electric car or tractor, of a removable knife-supporting frame movably attached at one end of said car, a mower knife mounted in said frame, a separate motor partly balancing the knife carried in said frame for actuating said mower knife, a removable threshing mill carried by said car, a separate motor for driving said mill, and means for conveying the material cut by said knife to said threshing mill.

4. In a machine of the character specified, a removable knife-supporting frame carried at one end of said car, a mower knife supported by said removable frame, a separate motor carried by said removable frame for actuating said mower knife, a removable threshing mill carried by said car and a separate motor for driving said mill, an endless apron adapted to convey the material cut by said knife to said threshing mill, a revolubly mounted reel adapted to feed material cut by said knife to said apron, and a motor for driving said reel and apron.

5. In a machine of the character specified, the combination with an electric motor car or tractor, of a removable frame carried by the car frame, a mower knife in said removable frame, a separate motor carried by said removable frame for actuating said mower knife, a reel removably mounted adjacent said mower knife, an endless apron to receive material from said reel and convey it to and feed it to a threshing mill, an elevator adapted to move material handled by said threshing mill, and a motor adapted to actuate said reel, said apron, said threshing mill and said elevator.

6. In a machine of the character specified, the combination with the machine frame and driving wheels therefor, of motors for driving said wheels, a removable frame carried by the machine frame, a reciprocable mower knife in said removable frame, and a separate motor carried by said removable frame for actuating said mower knife.

7. In a machine of the character specified, the combination with the machine frame and driving wheels therefor, of motors for actuating said driving wheels, a frame removably carried at one end of said machine frame, a mower knife supported by said removable frame, a separate motor carried by said removable frame and adapted to actuate said mower knife, an endless apron, a revolubly mounted reel adapted to feed material to said apron and a motor for driving said fan and apron.

8. In a machine of the character specified, the combination with the machine frame and driving wheels therefor, of a separate motor for driving each of said wheels, a frame removably carried by said machine frame, a mower knife supported in said removable frame, a separate motor carried by said removable frame and adapted to actuate said mower knife, a reel revolubly mounted adjacent said mower knife, an endless apron to receive material from said reel and convey it to and feed it to a threshing mill an elevator adapted to move material handled by said threshing mill, and a motor adapted to actuate said reel, said apron, said threshing mill and said elevator.

In testimony whereof I have signed my name to this specification in the presence of two subscribing witnesses.

HJALMAR SIGFRID CASSEL.

Witnesses:
ERNEST NORDLINDH,
G. NORDLINDH.